United States Patent [19]
Uchida et al.

[11] Patent Number: 6,025,983
[45] Date of Patent: Feb. 15, 2000

[54] SWITCHGEAR

[75] Inventors: Yoshinori Uchida; Coichi Shichida; Yoshihiro Ookawa, all of Tokyo, Japan

[73] Assignee: Mitsubishi Denki Kabushiki Kaisha, Tokyo, Japan

[21] Appl. No.: 09/118,915

[22] Filed: Jul. 20, 1998

[30] Foreign Application Priority Data

Jul. 24, 1997 [JP] Japan ................................... 9-198543

[51] Int. Cl.7 .................................................. H02B 11/00
[52] U.S. Cl. ....................................... 361/606; 200/50.23
[58] Field of Search ............................. 200/50.17, 50.21, 200/50.22, 50.23; 361/606, 608–609, 616–617

[56] References Cited

U.S. PATENT DOCUMENTS 4,449,021  5/1984  Wakayama et al. ................. 200/50.23

FOREIGN PATENT DOCUMENTS 57-170422  10/1982  Japan .
5-325743   12/1993  Japan .

*Primary Examiner*—Gregory Thompson
*Attorney, Agent, or Firm*—Sughrue, Mion, Zinn, Macpeak & Seas, PLLC

[57] ABSTRACT

A switchgear comprising an electrically insulating frame having an operating mechanism accommodated at its front portion and having a main circuit accommodated at its rear portion. The insulating frame defines a space surrounded at three sides by opposing side insulating walls and a rear insulating wall arranged substantially in a U-shaped cross section. The insulating frame also supports a switch portion within the space and supports a terminal conductor leads from the switch portion extending through the rear insulating wall to project toward the rear of the switchgear. The switchgear also comprises an electrically insulating cover covering at a front side of the insulating frame at least the rear end, the top end and the opposing side ends of the operating mechanism. Also, the switchgear may comprises a face plate disposed to a front portion of the switchgear and an operating mechanism disposed between the face plate and the insulating frame. Therefore, the insulating distance between the components can be made small and no metal casing is necessary, allowing the switchgear to be small-sized and simple in structure.

3 Claims, 5 Drawing Sheets

SWITCHGEAR

BACKGROUND OF THE INVENTION

This invention relates to a switchgear and, more particularly, to a power switchgear such as a circuit interrupter and a contactor.

FIG. 6 illustrates a construction of a distribution panel into which interrupters are incorporated. In the figure, reference numeral 1 is a housing of the distribution panel, 1a s bar compartment defined by partition walls within the housing, 1b is an interrupter compartment, 1c is a cable compartment, 1d is a controller compartment and 1e is a sub-floor space below the interrupter compartment 1b which is supplied with air from the cable compartment 1c on its side and discharge air from the space below the interrupter 7 through a hole (not shown) formed in the ceiling portion of the sub-floor space 1e. 1f is a vent passage for upwardly guiding the air ventilated upwardly from the interrupter 7 and for discharging it outside through an exhaust port (not shown). 2 is a panel-connecting bus bar connected to each of the distributor panels arranged in the depth direction as viewed in the plane of FIG. 6. 3 is an insulator, 4 is a shunt bust bar shunted from the connection bus bar 2, 5 is a bushing, 6 is a main circuit disconnector portion disposed within the bushing, 7 is an interrupter arranged withdrawable in the leftward direction in FIG. 6, 8 is a cable, 9 is a connection conductor connecting the cable 8 to the disconnector portion 6 of the bushing 5 and 10 is a current transformer.

FIG. 7 illustrates one example of the interrupter that can be used in the abovementioned distribution panel disclosed for example in Japanese Patent Laid-Open No. 57-170422. In the figure, 11 is a carriage of the interrupter 7, 12 is a face plate covering the front face of the interrupter 7, 13 is an operating mechanism, 14 is an insulating frame, 14a is a front insulating wall defining a space on the side of the operating mechanism 13, 14b is a side insulating wall defining the side of the insulating frame 14. 15 is a vacuum valve or a switch portion held within the insulating frame 14, 18 are terminal conductors connected to the vacuum valve 15 through a stationary conductor or a flexible conductor 17 and has one end projected from the insulating, frame and 19 are contacts connected to the free ends of the terminal conductors 18 to contact with the main circuit portion 6.

It is to be noted that the operating mechanism 13 is a precise assembly of the precision mechanisms which is required to be always ready for an immediate operation when circuit interruption is required for circuit protection for an extended period of ten to twenty years without being subjected to an inspection or maintenance, so that the operating mechanism is usually enclosed by a metal case in order to eliminate the risk of malfunction of the mechanism due to dust or the like.

Since the conventional interrupter has the construction as above described, the insulating distance A between the operating mechanism 13 and the outer diameter portion of the flange 15a of the vacuum valve 15 which is a live portion of the switchgear could be made small. However, since the insulating frame 14 is open at the side of the distribution panel, the insulating distance between the outer diameter portion of the flange 15a and the ground potential portion of the distribution panel must be made large, so that the distance B from the outer diameter portion of the flange 15a to the tip of the contact must be large, resulting in a large overall length L of the interrupter.

The insulating frame 14 made of an integrally molded material comprises integrally formed three insulating walls but one side must invariably be left open because of the molding method. Heretofore, this open end has been used as the opening for introducing the terminal conductors. Under these conditions, if the insulating distance should be made further smaller, the open end could be closed by an electrically insulating plate. However, since a large amount of heat is generated from the vacuum valve 15 and the conductors 16–18 for an interrupter of a higher rated current, a good ventilation within the insulating fame 14 is necessary to improve the cooling, which requires that the open end of the insulating frame 14 be kept open, obstructing the interrupter to be made small-sized.

Also, since the operating mechanism is enclosed within a metal case to prevent the entry of the dust or the like to ensure a long term reliable precision operation of the operating mechanism, when the open end of the insulating frame is used on the operating mechanism, the insulating distance at the open end of the insulating frame will become disadvantageously large.

SUMMARY OF THE INVENTION

Accordingly, an object of the present invention is to provide a switchgear free from the above discussed problems of the conventional switchgear.

Another object of the present invention is to provide a switchgear that is compact and still sufficiently cooled.

Another object of the present invention is to provide a switchgear improved in dust proof operating mechanism.

With the above objects in view, the switchgear of the present invention comprises an electrically insulating frame having an operating mechanism accommodated at its front portion and having a main circuit accommodated at its rear portion mounted on a carriage. The insulating frame defines a space surrounded at three sides by opposing side insulating walls and a rear insulating wall arranged substantially in a U-shaped cross section. The insulating frame also supports a switch portion within the space and supports a terminal conductor leads from the switch portion extending through the rear insulating wall to project toward the rear of the switchgear. The switchgear also comprises an electrically insulating cover covering at a front side of the insulating frame at least the rear end, the top end and the opposing side ends of the operating mechanism.

Alternatively, the switchgear may comprise a face plate disposed to a front portion of the switchgear and an operating mechanism disposed between the face plate and the insulating frame.

BRIEF DESCRIPTION OF THE DRAWINGS

The present invention will become more readily apparent from the following detailed description of the preferred embodiments of the present invention taken in conjunction with the accompanying drawings, in which.

DETAILED DESCRIPTION OF THE PREFERRED EMBODIMENTS

Figure 1:
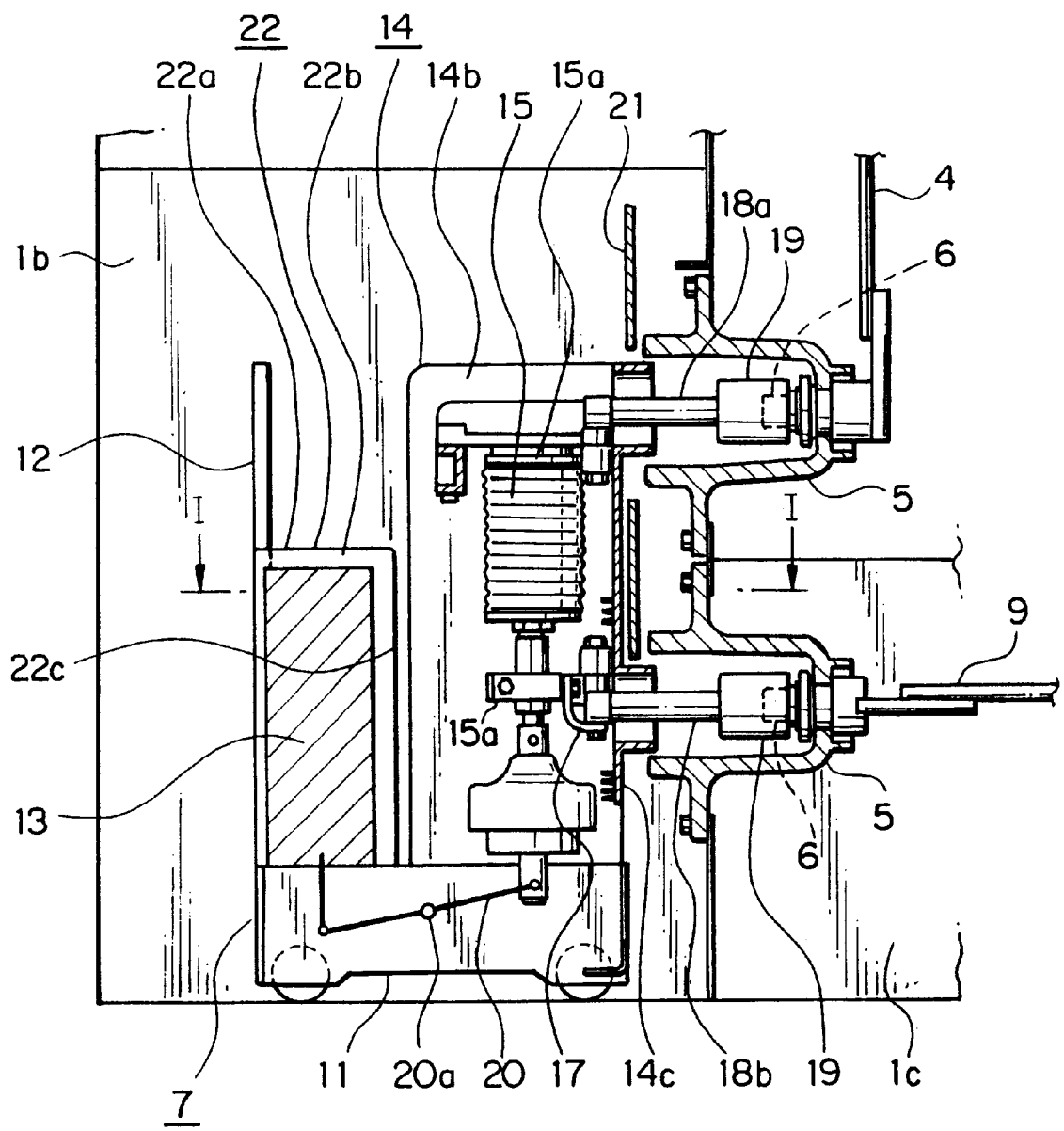
FIG. 1 is a sectional side view of the vacuum interrupter showing one embodiment of the present invention.
Figure 7:
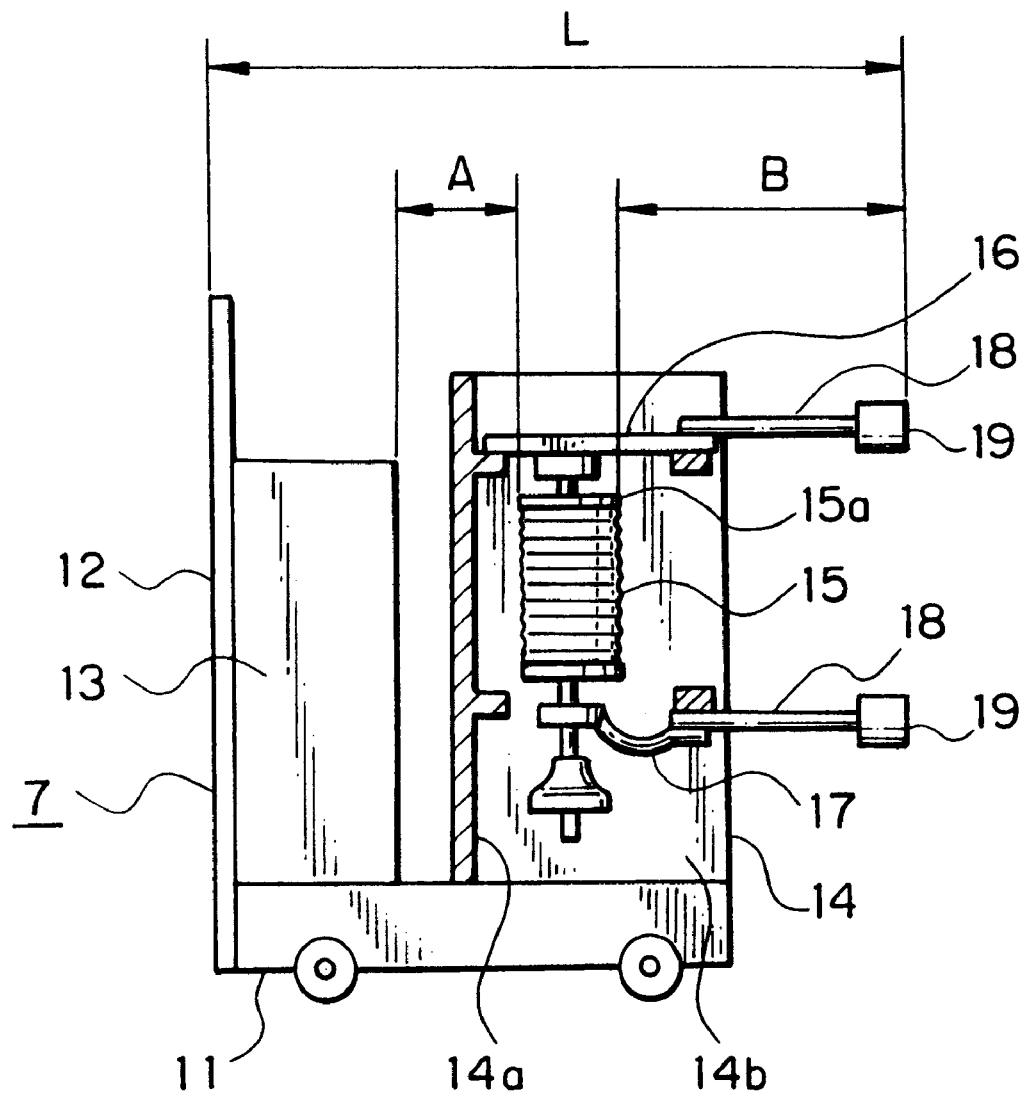
FIG. 7 is a sectional side view of a conventional interrupter.

FIG. 1 is an exploded perspective view of a switchgear of the first embodiment of the present invention, in which the components 1b, 1c, 4, 5, 6 and 9 are identical or similar to those shown and described in connection with the conventional switchgear shown in FIG. 7 so that their description will be omitted. The reference numeral 11 is a carriage with wheels for the interrupter and has a face plate 12 having a width corresponding to that of the interrupter 7 to cover the front end of the carriage 11. The carriage 11 has mounted at the front portion thereof an operating mechanism 13 and an electrically insulating frame 14 at the rear portion of the carriage 11. The insulating frame 14 comprises side insulating walls 14b at the opposite side portions and a rear insulating wall 14c at the end facing toward the main circuit disconnector portion 6 of the distributor panel. 15 is a vacuum valve (i.e., the switch portion), 17 is a flexible conductor, 18a is an upper terminal conductor secured to the insulating frame 14 with the vacuum valve 15 suspended therefrom and extending through the rear insulating wall 14c at one end, 18b is a lower terminal conductor having one end connected to the flexible conductor 17 and having the other end extending through the rear insulating wall 14c and secured to the insulating frame 14, 19 are contacts mounted to the end portions of the terminal conductors 18a and 18b and inserted within the bushing 5 so as to be capable of contacting with and separating from the main circuit disconnector portion 6, 20 is a link mechanism rotatable about a pivot 20a for transmitting an operating force from the operating mechanism 13 to the vacuum valve 15, 21 is a shutter which comes down after the interrupter 7 is withdrawn to close the front opening portion of the bushing 5, 22 is an insulating cover having one end inserted between the operating mechanism 13 and the insulating frame 14 like a partition wall, the bottom end being in abutment with the carriage 11 and the front face being in abutment with the face plate 12 to completely cover the operating mechanism 13 at its top, bottom, front, rear left and right.

Figure 2:
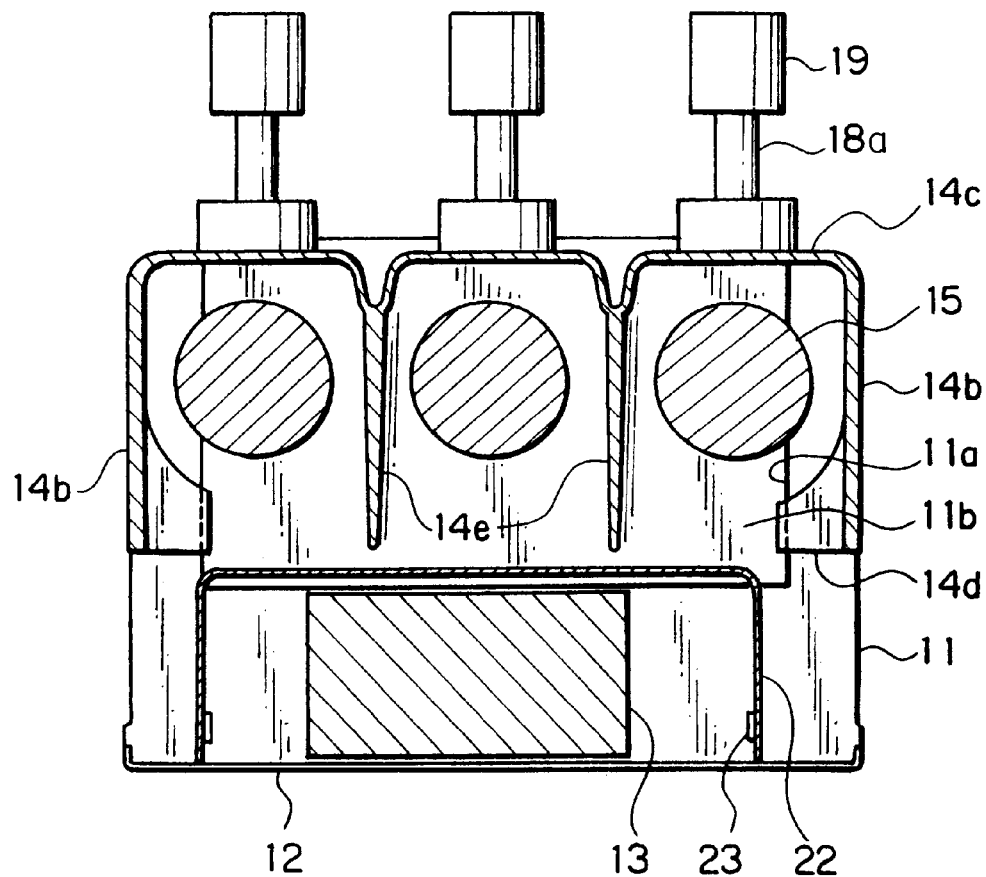
FIG. 2 is a sectional side view of the interrupter taken along line C—C of FIG. 1.

FIG. 2 is a sectional view taken along line I—I of FIG. 1 and showing the interrupter alone. From the figure, it is seen that the carriage 11 positioned at the bottom portion of the insulating frame 14 has leg portions 11a disposed at both sides thereof which project rearwardly of the interrupter 7 only at these leg portions 11a and defines at its center an opening 11b for ventilation and that the insulating frame 14 being mounted on the leg portions 11a. Also, the insulating frame 14 comprises a rear insulating wall 14c disposed on the side to which the terminal conductors 18a and 18b are lead to cover the rear end and side insulating walls 14b disposed at the opposite side portions to cover the opposite ends. The insulating frame 14 defines a space of a generally U-shaped configuration as viewed in plan. Mounting legs 14d are provided to the insulating frame 14 in order to mount the insulating frame 14 to the carriage 11 and inter-phase barriers 14e for separating the respective phases within the insulating frame 14. An electrically insulating cover 22 is fixed to the carriage 11 by mounting plates 23.

Figure 3:
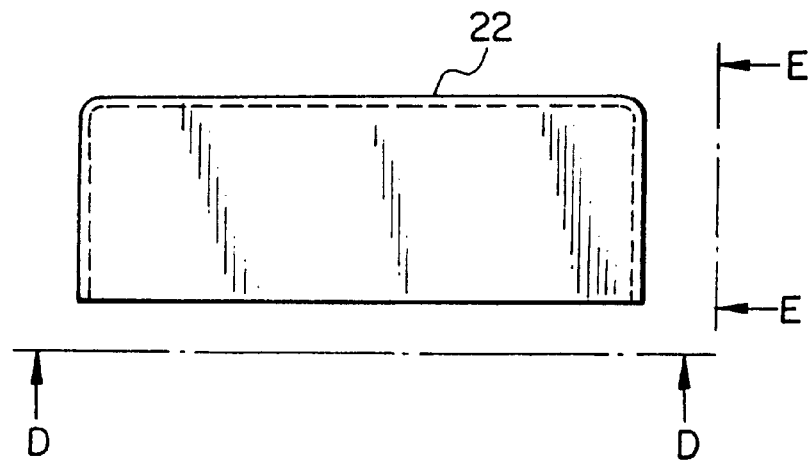
FIG. 3 is a plan view of the insulating cover shown in FIG. 1.
Figure 4:
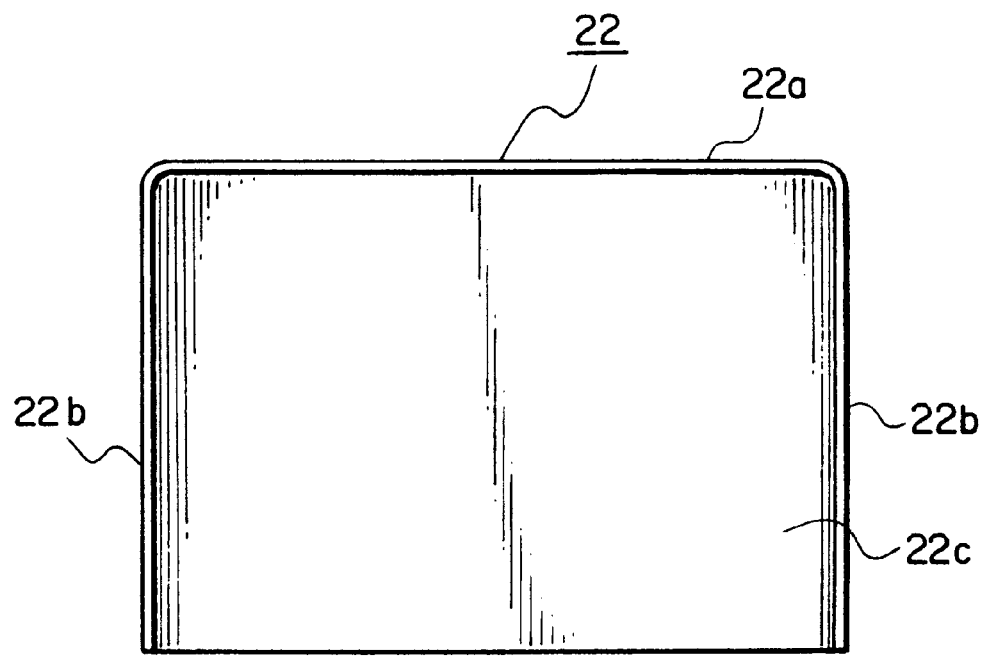
FIG. 4 is a side view of the insulating cover as viewed in the direction D—D shown in FIG. 3.
Figure 5:
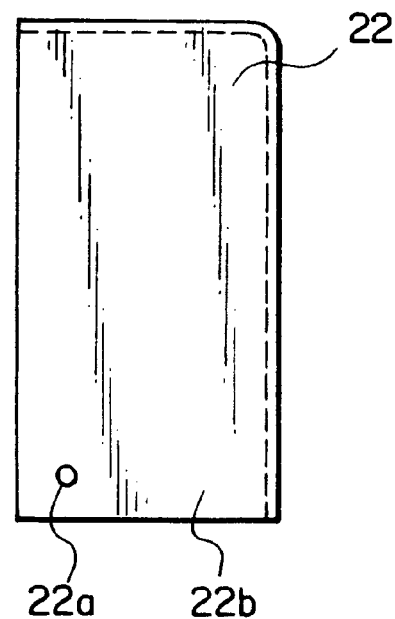
FIG. 5 is a side view of the insulating cover as viewed in the direction E—E shown in FIG. 3.
Figure 6:
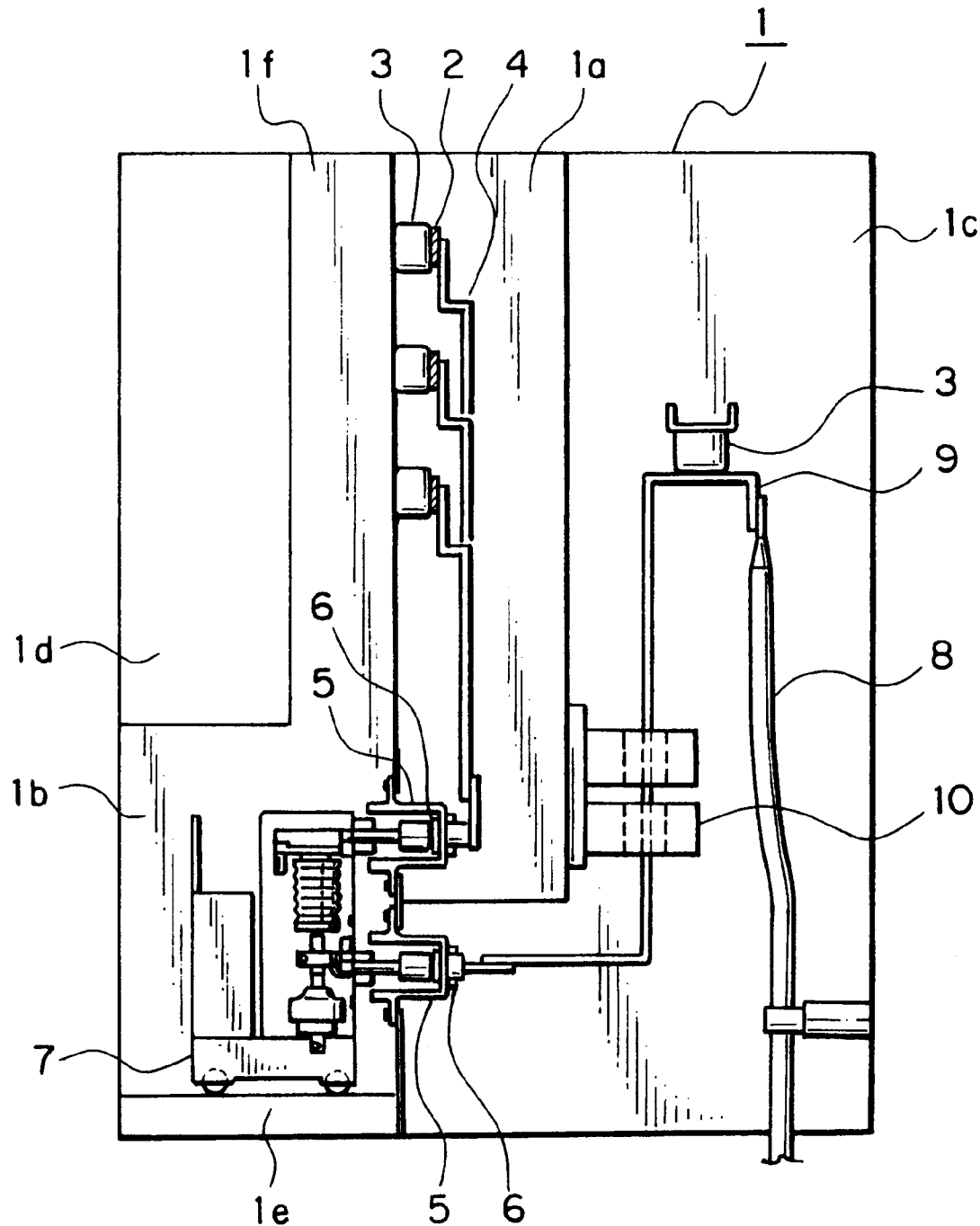
FIG. 6 is a sectional side view of the distribution panel having the switchgear of the first embodiment of the present invention as one example.

FIG. 3 is a top plan view of the insulating cover 22 shown in FIG. 2 and FIG. 4 is a side view of the insulating cover 22 shown in FIG. 3, in which the reference numeral 22a is a top plate, 22b are side plates and 22c is a rear plate. FIG. 5 is a side view of the insulating cover 22 shown in FIG. 3, 22d being mounting holes provided in the side plates 22b on the opposite sides.

With the above-described structure, since the rear insulating wall of the insulating frame 14 is disposed between the ground potential portion of the distribution panel and the vacuum valve 15 of the interrupter 7 or the main circuit member connected to the vacuum valve 15, the insulating distance between these components can be made small. Also, since the rear end plate of the insulating cover 22 is disposed between the operating mechanism 13 and the insulating frame 14 or the main circuit member housed therein, the insulating distance between the operating mechanism 13 which is at a ground potential and the vacuum valve 15 within the insulating frame 14 can be made small, so that the depth dimension of the interrupter 7 can be made small. Also, with such the structure, even when the insulating distance at the front and rear of the vacuum valve 15 is made small, a large ventilating passage which extends from the opening 11b at the lower portion of the carriage 11 through the side of the vacuum valves 15 to above the vacuum valves 15 can be maintained, providing an advantageous result that the switchgear is not needed to be large-sized even when a large amount of heat is generated due to the large electric current owing to the effective cooling efficiency.

Also, since the operating mechanism 13 is covered by the insulating cover 22, the ingress of the dust or other foreign matters into the operating mechanism 13 can significantly be decreased, so that the protective metal case for the operating mechanism 13 can be eliminated. Also, the front portion of the insulating cover 22 is brought into abutment so as to utilize it as a cover for the operating mechanism 13, allowing the insulating cover 22 to have a simple structure.

While the present invention has been described in conjunction with the vacuum circuit interrupter, the present invention provides similar advantageous results when applied to other interrupter or contactor.

As has been described, the switchgear of the present invention comprises an electrically insulating frame having an operating mechanism accommodated at its front portion and having a main circuit accommodated at its rear portion mounted on a carriage. The insulating frame defines a space surrounded at three sides by opposing side insulating walls and a rear insulating wall arranged substantially in a U-shaped cross section. The insulating frame also supports a switch portion within the space and supports terminal conductor leads from the switch portion extending through the rear insulating wall to project toward the rear of the switchgear. Therefore, the insulating distance between the components can be made small, allowing the switchgear to be small-sized.

The switchgear also comprises an electrically insulating cover covering at a front side of the insulating frame at least the rear end, the top end and the opposing side ends of the operating mechanism, so that the metal case for the operating mechanism is not necessary, realizing a switchgear of a simple structure in which the casing for the operating mechanism is not needed.

Alternatively, the switchgear comprises a face plate disposed to a front portion of the switchgear and an operating mechanism disposed between the face plate and the insulating frame, so that the insulating cover is not needed to be in the shape of a box or a pouch, making the manufacture of the insulating cover easy.

What is claimed is:

1. A switchgear comprising:

an electrically insulating frame having an operating mechanism at a front portion of said insulating frame and having a main circuit located at a rear portion, said insulating frame being mounted on a carriage and defining a space surrounded at three sides by opposing side insulating walls and a rear insulating wall arranged substantially in a U-shaped cross section and supporting a switch portion within said space, and supporting a terminal conductor lead from said switch portion extending through said rear insulating wall to project toward the rear of the switchgear; and an electrically insulating cover covering at a front side of said insulating frame the rear end, the top end and the opposing side ends of said operating mechanism and whereby said operating mechanism is enclosed at the front end by a face plate and at the bottom end by said carriage.

2. A switchgear comprising:

an electrically insulating frame having an operating mechanism at a front portion of said insulating frame and having a main circuit located at a rear portion, said insulating frame being mounted on a carriage and defining a space surrounded at three sides by opposing side insulating walls and a rear insulating wall arranged substantially in a U-shaped cross section and supporting a switch portion within said space, and supporting a terminal conductor lead from said switch portion extending through said rear insulating wall to project toward the rear of the switchgear;

a face plate disposed to a front portion of the switchgear; and an electrically insulating cover covering the rear end, the top end and the opposing side ends of said operating mechanism and covering said operating mechanism with its opening portion brought into abutment with said face plate, wherein said operating mechanism is disposed between said face plate and said insulating frame.

3. A switch gear as claimed in claim 1 wherein said terminal conductor lead is movable into and out of a bushing opening and a shutter is provided to cover said bushing opening when said terminal conductor lead is moved out of said bushing.

* * * * *